INVENTORS
DONALD M. GARDNER
JOSEPH G. MARTINS
LEO J. MONAGHAN
BY William J. Farrington
AGENT

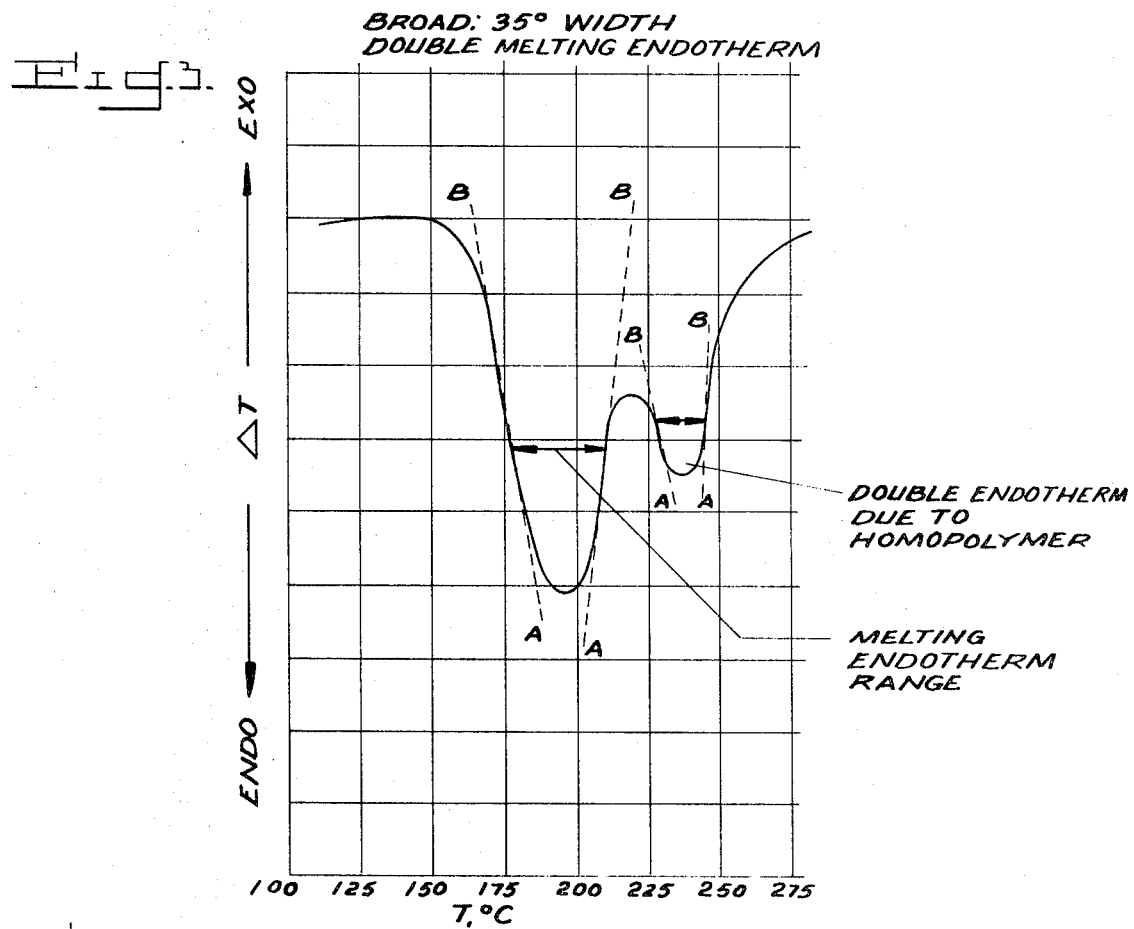
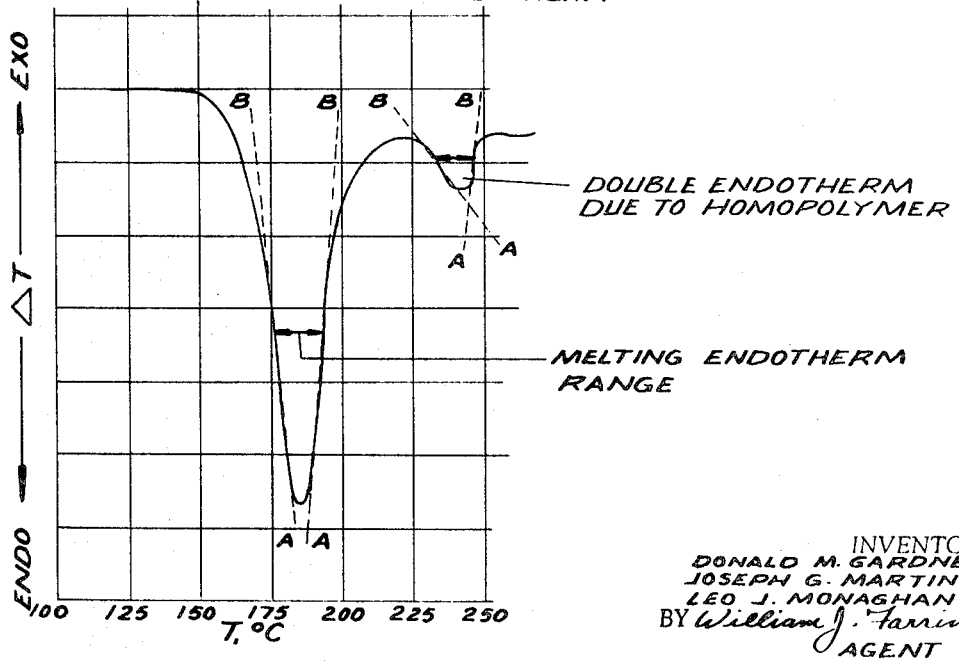

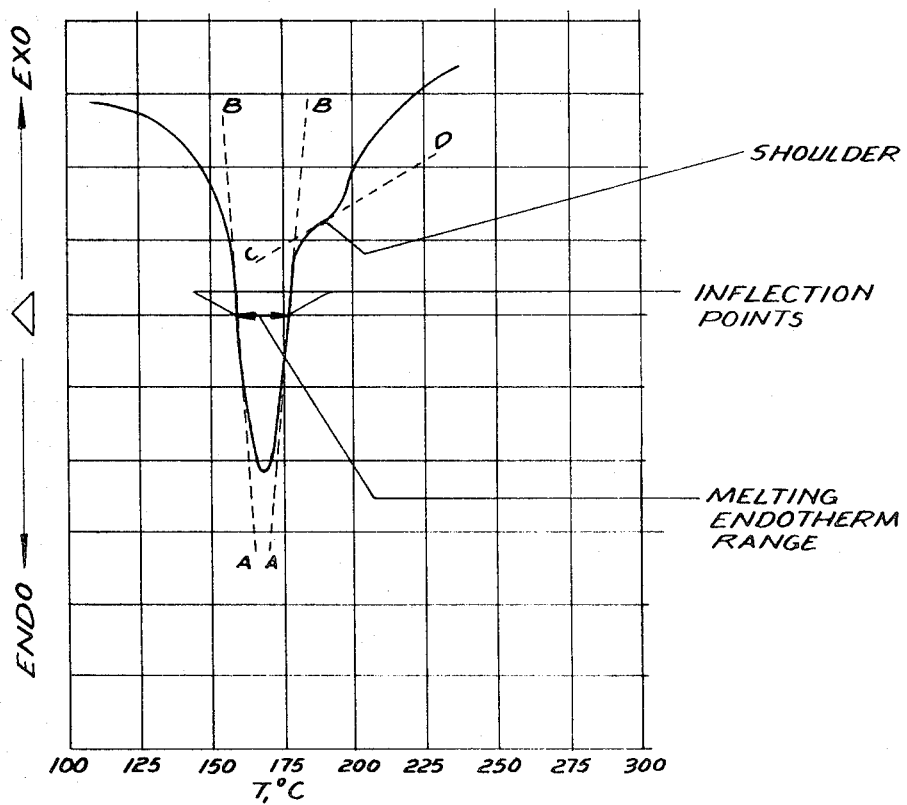

3,585,177
NOVEL POLY(OLEFIN/VINYL ALCOHOL)
PACKAGING MATERIALS
Donald M. Gardner, Springfield, Joseph G. Martins, Ludlow, and Leo J. Monaghan, Springfield, Mass., assignors to Monsanto Company, St. Louis, Mo.
Filed Nov. 30, 1966, Ser. No. 598,030
Int. Cl. C08f 15/02, 27/14
U.S. Cl. 260—87.3
8 Claims

ABSTRACT OF THE DISCLOSURE

Olefin/vinyl alcohol copolymers are prepared by a special process to give copolymers that have a narrow olefin distribution and which are substantially free of homopolymer segments. These novel copolymers are then formed into packaging materials which are characterized by having good thermal processing characteristics and low permeability to oxygen and water vapor.

Figure 1:
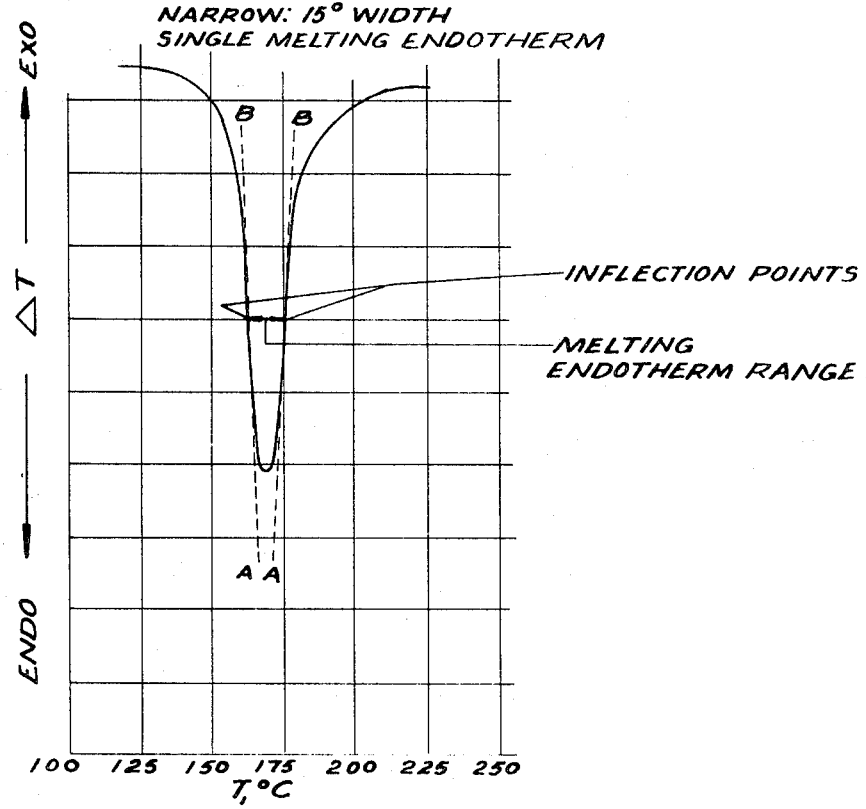

The currently available synthetic polymers which are used in the preparation of packaging materials for food stuffs, medicines, and related substances are characterized by one or more serious deficiencies which detract from their packaging utility. Most synthetic polymers with good thermoforming or processing characteristics have a high rate of oxygen permeability and water vapor transmission so that foods and medicines packaged in these materials suffer water gain or loss, oxidation, discoloration, loss of taste, aroma, etc., thereby losing their consumer appeal.

The vinylidene copolymers have sufficient oxygen impermeability to permit their use in some food packaging applications. However, the use of these materials has been largely confined to film applications because of the processing difficulties encountered in forming thick-walled objects. These vinylidene copolymers have poor heat seal characteristics, poor draw properties, low heat distortion temperatures and thermoforming stability, low modulus and low strength which seriously limits their widespread use.

Other polymer systems such as fully hydrolyzed polyvinyl alcohol have very high resistance to oxygen permeability, but these systems have serious deficiencies in that they are water sensitive and have a very high water vapor transmission rate. Furthermore, these polyvinyl alcohol polymers fail to retain their excellent resistance to oxygen permeability at conditions of high humidity and in general have poor processing characteristics, which precludes thermal processing into shaped articles. The poor thermal processability stems from the necessity of heating the resin above its melting point (220–240° C. is the crystalline melting point range of polyvinyl alcohol) and under these conditions the resin undergoes thermal decomposition.

The currently available olefin/vinyl alcohol copolymers are characterized by a thermal processing behaviour and barrier properties which limits their utility as packaging materials. Notable among these deficiencies is the tendency of the resin to develop gel specks and/or burn spots during the extrusion process. Furthermore, the broad distribution of olefin content in the available olefin/vinyl alcohol resins results in poor water vapor transmission rate (WVTR) properties.

A definite need exists for a new class of packaging materials which have a high resistance to oxygen permeability and a low water vapor transmission rate as well as improved processing and physical properties to allow their fabrication into diverse shapes and sizes, e.g., bottles, containers, sheets, thin films, etc.

It is therefore an object of this invention to provide novel packaging materials for foods, medicines, and related objects, wherein the packaging materials exhibits a high resistance to oxygen permeability and a low water vapor transmission as well as improved processing and physical properties.

It is a further object of this invention to provide a process for the preparation of packaging materials for foods, medicines, and related objects, wherein the packaging materials exhibit a high resistance to oxygen permeability and a low water vapor transmission rate as well as improved processing and physical properties.

It is a further object of this invention to provide foods, medicines, and unrelated substances which are protected by a novel packaging material which exhibits high resistance to oxygen permeability and a low water vapor transmission rate as well as improved processing and physical properties.

These and other objects are obtained by providing packaging materials for foods, medicines and other related substances, wherein the packaging material exhibit oxygen permeability of less than 1.0 cc./100 sq.in./24 hr./cm. Hg./mil at 73° F. and water vapor transmission of less than 8.5 gms./100 sq. in./24 hr./mil at 73° F. and 100% R.H. and comprise a lower alpha olefin/vinyl alcohol copolymer wherein the olefin content in the copolymer is between 5.0 to 40% by weight, and the residual ester content of the vinyl alcohol portion is below 3.0% and wherein the differential thermal analysis curve for the copolymer is a single narrow endotherm having a melting range of less than 30° C.

PART I.—PREPARATION OF OLEFIN/VINYL ALCOHOL RESIN

As pointed out above, the available ethylene/vinyl ester and ethylene/vinyl alcohol resins prepared therefrom have serious drawbacks such as poor thermal processability poor oxygen permeability and poor WVTR properties which generally precludes their use in the more critical packaging applications. It has been found that in order to achieve the oxygen permeability and water vapor transmission rates (WVTR), which are critical in the packaging applications described in this invention, it is necessary to polymerize the olefin/vinyl ester resin according to a specific and critical manner.

The usual olefin/vinyl ester polymerization methods as set forth in the prior art make no attempt to achieve a narrow distribution of olefin content in the respective polymer chains nor do they attempt to preclude the formation of homopolymer segments. As a result, olefin/vinyl ester resin or ole/vinyl alcohol resins prepared therefrom contain a broad olefin distribution and/or homopolymer segments of either olefin, vinyl ester or vinyl alcohol. In a surprising and unexpected manner, it has been discovered that when the olefin content is maintained within a narrow distribution range and significant amounts of homopolymer segments of ether olefin or vinyl alcohol are avoided surprisingly improved packaging properties are found in the resulting olefin/vinyl alcohol resins of this invention.

Figure 2:
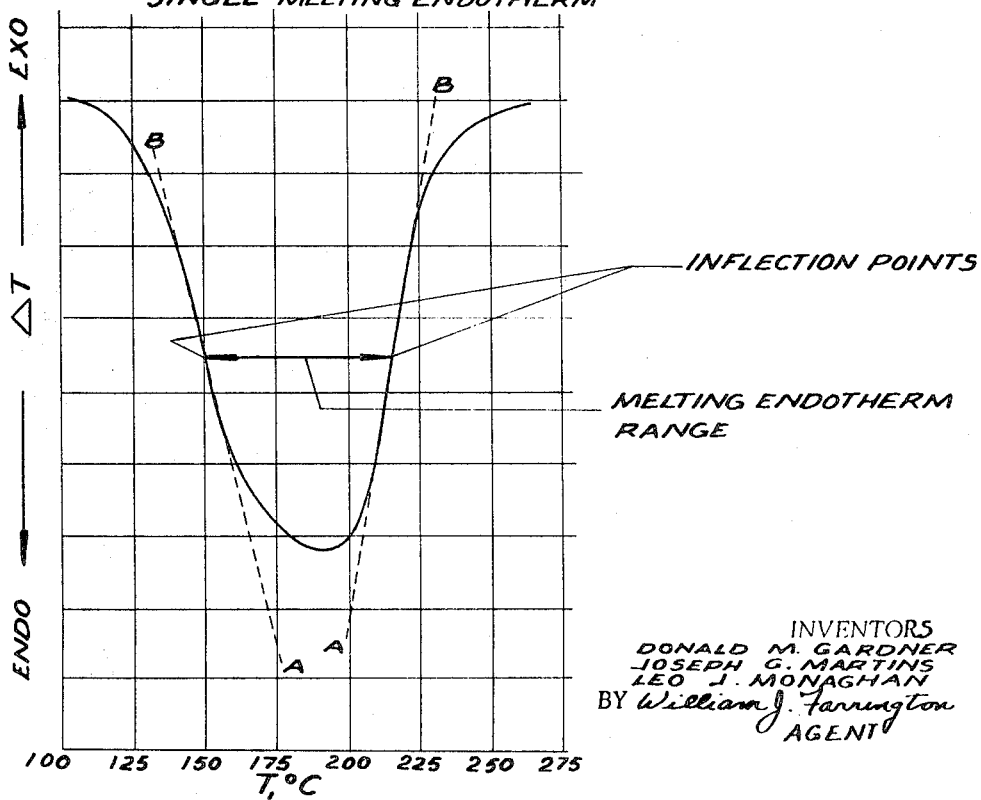

The olefin distribution range and the presence of homopolymers is most conveniently measured using differential thermal analysis (DTA) techniques. The differential thermal analysis (DTA) is carried out according to the procedure set forth by D. A. Vassallo and J. C. Harden in Analytical Chemistry, volume 34, January 1962, pages 132–5, using a DuPont 900 Differential Thermal Analyzer programmed at a 30° C./minute rate. The analytical results may be readily understood by referring to FIGS. 1 to 5 in the attached drawings. FIG. 1 shows a DTA curve for the preferred polymers of this invention wherein the curve is characterized by a single narrow melting endotherm having a range of less than 30° C. which indicates a narrow olefin distribution in the copolymer. The dotted lines AB are drawn through the inflection points for the respective curves and the melting endotherm ranges for the polymers are measured between these points. FIG. 2 shows a DTA curve with melting endotherm range of 65° C. as measured between the inflection points. This curve is characteristic of a material with a broad distribution of olefin which is unsuitable in the practice of this invention. Both FIGS. 1 and 2 are characterized by a single melting endotherm which indicates that there are no significant amount of homopolymer present. FIG. 3 shows a melting endotherm range of 35° C. for the copolymer and a second melting endotherm due to the presence of vinyl alcohol homopolymer. The melting endotherm range of the copolymer is greater than 30° C. making this particular copolymer unsuitable for the practice of this invention. FIG. 4 illustrates a copolymer having a melting endotherm range of less than 30° C. which indicates that the olefin distribution is within the necessary range for use in the practice of this invention. However, the second melting endotherm indicates the presence of vinyl alcohol homopolymer and makes the total resin composition unsuitable for use in the practice of this invention.

FIG. 5 shows a single endotherm with a third inflection point where line CD is tangential to the curve. This inflection point which is referred to as a shoulder, indicates the presence of a very small amount of homopolymer, i.e., less than 2%. The amount of homopolymer present may be calculated by a comparison of the areas under the respective curves. In the practice of this invention up to 2% of homopolymer may be tolerated.

The following Example 1 is set forth to illustrate the critical procedures required in the polymerization of the polymers used in this invention.

Example 1

1250 grams of vinyl acetate monomer is charged to a one-gallon stainless steel autoclave equipped with an internal cooling coil and agitation means. The vessel and contents are cooled to 15° C. by circulating cold water in the cooling coil. 1.125 grams of solid isopropyl percarbonate is added to 1250 grams of vinyl acetate previously cooled to −40° C. The percarbonate dissolves readily with gentle agitation and the solution is then poured into the autoclave. The autoclave is pressurized while maintaining agitation, with 100 p.s.i.g. ethylene and then vented to zero p.s.i.g.; the autoclave is purged twice again in the same manner in order to remove any oxygen from the autoclave and its contents. Then the reaction temperature is increased to 45° C. by means of an external electrical heating mantle; the pressure is 100 p.s.i. before heating and additional ethylene is added to bring the pressure to 450 p.s.i. simultaneously with the temperature rise to 45° C. The reaction temperature was controlled between 44 and 46° C. The autoclave is vented several times during the run in order to maintain a constant pressure of 450 p.s.i. The cooling of the monomer and the simultaneous increase in temperature and pressure is carried out to avoid any premature polymerization that would result in any homopolymer segments. After four hours reaction time a monomer conversion of 35.8% is achieved and the autoclave contents are cooled rapidly to 20° C. without venting of pressure and the contents are dumped into two volumes of methanol containing 0.1% by weight of inhibited styrene monomer which process acts to rapidly quench the polymerization proces and avoid residual polymerization that may produce segments of homopolymer. The ethylene/vinyl acetate resin is recovered within 24 hours by disintegration of the varnish into several volumes of hexane. The resin which was dried overnight at 75° C. had an ethylene content of 13.5% by weight and a viscosity number of 0.763 dl./g. in toluene (0.25 g./100 ml.) at 25° C.

The foregoing ethylene/vinyl acetate polymer is hydrolyzed to form ethylene/vinyl alcohol polymer having less than 3% residual vinyl acetate groups. The hydrolysis was carried out using a 4% by weight solution of sodium hydroxide in methanol according to the procedures well known to those skilled in the art.

The hydrolyzed ethylene/vinyl alcohol resin has a viscosity number of 1.414 dl./g. in dimethyl sulfoxide (0.25 g./100 ml.) at 25° C.

A differential thermal analysis (DTA) curve of the hydrolyzed polymer shows a single narrow melting endotherm having a range of 15° C. with a minimum at 177° C. The narrow endotherm indicates that the ethylene/vinyl alcohol polymer has a narrow ethylene distribution, i.e., the individual chain segments that make up the polymer mass have a narrow ethylene distribution around a mean which is the total amount of ethylene in the copolymer. The single melting endotherm indicates that the polymer does not have significant amounts of homopolymer in the resin.

This critical narrow distribution of ethylene and the absence of significant amounts of homopolymer segments are peculiar to the copolymers of this invention and are not found in the olefin/vinyl alcohol copolymers heretofore known in the art. It is this narrow distribution and absence of significant amount of homopolymer that causes the unexpected improvement in the properties of the ethylene/vinyl alcohol resins of this invention that results in the superior packaging properties.

The following Examples 2 to 7 are set forth in tabular form to illustrate some of the possible variations in ethylene compositions that may be obtained in the practice of this invention. In each example, the general procedures outlined in Example 1 are followed except for the conditions noted. The resulting ethylene/vinyl acetate copolymer is hydrolyzed to form a resin with a residual acetate content of less than 3% by weight.

TABLE I.—ETHYLENE/VINYL ALCOHOL COPOLYMERS

| Example | Temperature | Ethylene pressure, p.s.i. | Percent conversion [1] | Percent ethylene in polymer | Viscosity dl./g.[2] | DTA curve [3] | |
|---|---|---|---|---|---|---|---|
| | | | | | | Range | Min. |
| 2 | 75 | 150 | 23.6 | 8.9 | 2.50 | 15 | 206 |
| 3 | 85 | 300 | 29 | 12 | 0.92 | 11 | 201 |
| 4 | 40 | 310 | 23.6 | 18 | 1.71 | 16 | 184 |
| 5 | 55 | 600 | 9.0 | 24 | 1.29 | 15 | 169 |
| 6 | 47 | 570 | 14.8 | 28 | 1.26 | 14 | 169 |
| 7 | 85 | 1,100 | 31.6 | 36.7 | 0.73 | 20 | 152 |

[1] Measured at termination of reaction on the basis of total solids formed.
[2] Measured in toluene (0.25 g./100 ml.) at 25° C.
[3] The analysis is carried out on the ethylene/vinyl alcohol polymer after hydrolysis. All curves showed single endotherm with no significant amounts of homopolymer.

The following examples 8–10 are set forth in Table II as further examples of olefin/vinyl alcohol copolymers contemplated within the scope of this invention. In each case the general procedures of Example 1 are followed and the olefin/vinyl ester polymer is hydrolyzed to a residual ester content of less than 3% by weight.

TABLE II.—OLEFIN/VINYL ALCOHOL POLYMERS

| Example | Olefin | Temperature | Olefin pressure, p.s.i. | Percent conversion [1] | Percent olefin in polymer | Viscosity, dl./g. | DTA curve [2] Range | Min. |
|---|---|---|---|---|---|---|---|---|
| 8 | Propylene | 85 | 90 | 9.2 | 8.2 | 1.59 | 15 | 191 |
| 9 | do | 70 | 130 | 16.3 | 26.2 | 1.06 | 30 | 154 |
| 10 | Isobutylene | 85 | ([3]) | 34.1 | 20.1 | 1.22 | 24 | 167 |

[1] Measured at termination of reaction on the basis of total solids formed.
[2] The analysis is carried out on the olefin/vinyl alcohol polymer after hydrolysis. All curves showed single endotherm with no significant amounts of homopolymer.
[3] 10% by weight charged to autoclave.

The first number is the range of the melting endotherm while the second numeral given is the temperature at which the minimum occurred. Both values are in degrees centigrade.

The olefins used in the practice of this invention are the lower alpha olefins of from 2 to 4 carbon atoms, e.g., ethylene, propylene, butene-1 and isobutylene. Especially preferred is ethylene.

Suitable vinyl esters which can be copolymerized with the olefin comonomers and subsequently hydrolyzed to form the olefin/vinyl alcohol copolymers of this invention include vinyl ester monomers of the general formula:

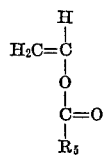

wherein $R_5$ is selected from the group comprising hydrogen, alkyl groups of from 1 to 10 carbon atoms, aryl groups of from 6 to 10 carbon atoms including the carbon atoms in ring substituted alkyl substituents, e.g., vinyl formate, vinyl acetate, vinyl propionate, vinylbutyrate, vinyl benzoate and the like.

The preferred olefin/vinyl alcohol packaging materials are ethylene/vinyl alcohol copolymers wherein the ethylene content is from 5 to 40 weight percent based on the weight of the copolymer. Especially preferred are ethylene/vinyl alcohol copolymers wherein the ethylene content is from 8.9 to 36.7 weight percent based on the weight of the copolymer. Most especially preferred are ethylene/vinyl alcohol copolymers wherein the ethylene content is from 12 to 29.8 weight percent based on the weight of the copolymer.

The residual ester content of the copolymer should be less than 3% and preferably less than 2% by weight. Most preferably the residual ester content is less than 1% by weight. The preferred olefin/vinyl alcohol copolymer resins will contain less than 2% homopolymers. Especially preferred are homopolymers with less than 1% homopolymer.

This invention also contemplates the use of a synthetic or natural rubber component such as butadiene, isoprene, nitrile rubbers, natural rubbers, acrylonitrile/butadiene/styrene terpolymers, ethylene/propylene copolymers and terpolymers, chlorinated rubbers, etc., which are used to toughen or strengthen the packaging materials prepared in this invention.

The rubbery component may be incorporated into the olefin/vinyl alcohol copolymer by any of the methods which are well known to those skilled in the art, e.g., direct polymerization of monomers, polyblends, grafting, etc.

In the preparation of the polymers of this invention the olefin and the vinyl ester are polymerized in the presence of a free radical initiator to a conversion of from 20 to 70% at temperatures between −50° C. and 100° C. Re-content decreases as the polymerization temperatures are reduced.

action temperatures of from 0 to 50° C. are preferred because product quality is high while processing costs are generally minimized. The polymerization pressures are generally maintained at less than 1500 p.s.i. for an ethylene vinyl alcohol polymer containing up to 40% ethylene. The required pressure for a product of a given ethylene The choice of initiator system is based on the necessity for minimizing chain transfer reactions such as hydrogen abstraction; solubility in the polymerization medium; and a half-life for radical generation generally between 0.1 to 100 hours and preferably between 0.5 to 5 hours. These initiators considerations are well known to those skilled in the art and need no further discussion here.

Examples of suitable initiators that meet the above requirements include the alkyl boranes such as triethyl borane, tripropyl borane, tributyl borane, etc. Tributyl borane is especially preferred for polymerization at subambient temperatures. Also included are azobis compounds such as azobisisobutyronitrile; organic and inorganic peroxy and hydroperoxy compounds such as salts of persulfuric acid, benzoyl peroxide, isopropyl percarbonate, hydrogen peroxide, etc.; the so-called redox combinations such as t-butylhydroperoxide/sodium formaldehyde sulfoxalate, etc.

Organic solvent, which may also be included in the polymerization charge, has the advantage of tending to increase the ethylene content of the polymer for a given polymerization pressure. Solvents are also useful for limiting the molecular weight achieved during polymerization. For this reason solvents are not used at all when it is desired to maximize molecular weight. For example, only 1% of methanol on the charge causes a significant reduction in polymer molecular weight. Examples of suitable solvents include alcohols, ketones, esters, aromatic hydrocarbons, etc.

In order to obtain a copolymer suitable for use in the critical packaging applications of this invention, wherein the copolymer has a narrow range of olefin distribution and has no significant amounts of homopolymer, certain critical steps in the polymerization process must be observed. An outline of these steps is set forth below.

(1) Monomer conversion should be held to amounts in the range of from 1 to 70% conversion with 5 to 45% being the preferred range.

(2) Prior to and during the polymerization reaction, the reactor system and reactants, solvents, should be purged free of oxygen.

(3) Conditions which would permit polymerization prior to the stabilization reaction temperature and olefin pressure or during the recovery step should be avoided.

(4) A constant temperature and constant olefin pressure should be maintained during the polymerization reaction. In this regard, the temperature should be maintained within ±5° C. and the olefin pressure with ±5% of the pressure specified for any given system.

The following Examples 11 to 15 are set forth to illustrate the necessity for observing the aforementioned critical steps. The poorer thermal processing and water vapor transmission rates that result from using copolymers with a broad olefin content and/or containing significant amounts of homopolymer will be discussed below in Part B.

Example 11

This example is set forth to illustrate that carrying the polymerization reaction beyond 70% conversion results in the formation of a copolymer with a broad ethylene distribution and which is also contaminated with homopolymer.

The general procedure of Example 1 is followed here except that the reaction is carried out at 85° C. and 925 p.s.i. to a conversion of about 75% to give a polymer with an ethylene content of 30 weight percent. Differential thermal analysis curves on this resin show a board melting endotherm range of 47° C. for the copolymer indicating a broad ethylene distribution and a second melting endotherm which indicates the presence of homopolymer in the resin sample.

Example 12

This example is set forth to illustrate the necessity for purging the system prior to the start of the polymerization reaction.

Example 1 is followed here except that neither the autoclave nor the reactants are purged free of oxygen. The resulting differential thermal analysis curves on the ethylene/vinyl alcohol copolymer shows a broad melting endotherm having a range of greater than 35° C. which makes this polymer unsuitable for use in the practice of this invention.

Example 13

In this example, which uses a procedure similar to that used in Example 1, the polymerization reaction is not quenched quickly but rather the pressure and temperature is decreased slowly after a conversion rate of about 40% is reached. The cooling and depressurizing steps are carried out over a 145 minute period as opposed to the rapid procedure of Example 1. The polymer is then recovered and hydrolyzed as in Example 1. The differential thermal analysis curve for this polymer shows a second melting endotherm which indicates the presence of homopolymer segments, and illustrates the need for a rapid termination of the polymerization reaction, if a narrow ethylene distribution and a substantial lack of homopolymer is to be achieved.

Example 14

Example 11 is repeated here except that 12 weight percent isobutylene is substituted for the ethylene used in Example 11. Comparable results are obtained in that the DTA curve shows a melting endotherm range of greater than 37° C. and the presence of homopolymer.

Example 15

Example 13 is repeated here except that propylene is substituted for the ethylene used in Example 13. Comparable results are obtained and the DTA curve shows a double inflection indicating the presence of homopolymer.

PART II.—PROPERTIES OF PACKAGING MATERIALS PREPARED FROM THE OLEFIN/VINYL ALCOHOL RESINS OF PART I

Introduction

The required degree of oxygen impermeability and water vapor transmission (WVTR) in a packaging material will vary with the particular food or medicine to be packaged and the storage conditions, e.g., temperature, humidity, ventilation, light type and intensity, etc. In general, the more critical applications will require materials with an oxygen permeability below 1.0 cc./100 sq. in./24 hr../cm. Hg/mil at 73° F. and a WVTR of less than 8.5 gms./100 sq. in./24 hr./mil at 73° F. and 100% R.H.

This criticality is illustrated in Modern Packaging, March 1965, "Flexible-vacuum Performance," pg. 201 ff. wherein the extreme sensitivity of coffee to moisture and oxygen is discussed. The authors of this article state that an increase in the moisture content of coffee of about 1.4 to 2.6% will cause a stale odor after 20 days, while only 14 cc. of oxygen will cause staling in one pound of coffee.

Dairy foods, meat products and some medicines show as much if not greater oxygen and moisture sensitivity as coffee and in some instances require packaging materials with even greater impermeability to oxygen and water vapor than that required for coffee packaging. This invention is directed toward furnishing a packaging material designed to meet these more critical packaging requirements.

Testing of packaging materials

The olefin/vinyl alcohol copolymers prepared in Part I above are compounded with conventional stabilizers and anti-oxidants and extruded into films having a thickness of from 1–7 mils, using extruder settings of 320–340° C. and die settings of 390–410° C.

The film samples are cut into circular sections and tested for oxygen permeability in a Dow Cell according to ASTM procedure D 1434–63 and for water vapor transmission rate (WVTR) in a Thwing-Albert cup according to a procedure comparable to ASTM procedure E 96–63T, Gas chromatograph tests are run on the bottles.

Four ounce (4 oz.) Boston Round bottles are also prepared using the copolymers prepared in Part I. The bottles were prepared using a blow molder and a stock temperature of 450–500° F. to give bottles with an average wall thickness of 20 mils.

TABLE III.—OXYGEN PERMEABILITY AND WVTR ON OLEFIN/VINYL ALCOHOL COPOLYMER FILMS

| Example | Olefin | Percent oelfin | DTA [1] | WVTR [2] | Oxygen permeability [3] | Extruded film properties |
|---|---|---|---|---|---|---|
| 1 | Ethylene | 13.5 | N, S | 7.4 | 0.16 | Clear. |
| 2 | do | 8.9 | N, S | 7.8 | 0.08 | Do. |
| 3 | do | 12 | N, S | 8.0 | 0.14 | Do. |
| 4 | do | 18 | N, S | 1.5 | 0.18 | Do. |
| 5 | do | 24 | N, S | 0.8 | 0.28 | Do. |
| 6 | do | 28 | N, S | 0.2 | 0.43 | Do. |
| 7 | do | 36.7 | N, S | 0.2 | 0.45 | Do. |
| 8 | Propylene | 8.2 | N, S | 8.1 | 0.23 | Do. |
| 9 | do | 26.2 | N, S | 2.3 | 1.9 | Do. |
| 10 | Isobutylene | 20.1 | N, S | 1.2 | 0.7 | Do. |
| 11 | Ethylene | 30 | B, D | 11.1 | 0.4 | Burn spots. |
| 12 | do | 14 | B, S | 9.5 | 0.15 | Gel specks. |
| 13 | do | 14.4 | D | 9.3 | 0.13 | Burn spots. |
| 14 | Isobutylene | 26 | B, D | 10. | 0.9 | Gel specks and burn spots. |
| 15 | Propylene | 21 | D | 11.1 | 2.3 | Burn spots. |

[1] N=Narrow endotherm of less than 30° C. whereas B indicates a broad endotherm of greater than 30° C. S=Single endotherm whereas D indicates a double endotherm.
[2] The WVTR rate is given in terms of grams of water transmission through a film, having a thickness of one mil and an area of 100 square inches, in a 24-hour period wherein the test conditions are maintained at 73° F. and 100% relative humidity (R.H.) on one side and zero percent humidity on the other.
[3] The oxygen permeability rate is given in terms of cubic centimeters of oxygen which permeates through a film having a thickness of one mil and an area of 100 square inches, during a 24-hour period under one centimeter of mercury (cm. Hg) of oxygen at 73° F.

The data in the foregoing table illustrates the superior WVTR oxygen permeability and film properties that are obtained when using olefin/vinyl alcohol copolymers prepared in accordance with the practice of this invention and which have an olefin content of from 5 to 40% by weight and a DTA curve with a single narrow endotherm.

Examples 1 to 10 are characterized by having an olefin content within the specified range and a single narrow endotherm which indicates a narrow range of olefin content in the respective polymer chains and no significant amount of homopolymer species present. Furthermore, these examples have oxygen permeability and WVTR values which are well within the maximum tolerable values of 1.0 cc. of oxygen/100 sq. in./24 hr./cm. Hg/mil at 73° F. and 8.5 gms. of water/100 sq.in./24 hr./mil at 73° F. and 100% R.H., which are required in the more critical packaging applications discussed above.

Note further that the film properties of Examples 1 to 10 are characterized by clear optical properties and a lack of gel or burn spots which are caused by a broad range in the olefin content of the polymer chains and/or by the presence of a significant amount of homopolymer.

Examples 11 to 15, which are prepared without observing the critical steps of the present invention, are characterized by a broad melting endotherm and/or a second melting endotherm due to the presence of homopolymer. Note that the WVTR properties and film properties for these samples are inferior to those materials prepared in accordance with the teaching of this invention. These poorer properties would preclude their use in the more critical packaging applications.

In regard to the copolymers which have been prepared in accordance with the teaching of this invention (Examples 1–10) the results in Table III illustrate that the copolymers of ethylene (Examples 1–7) give the lowest WVTR while copolymers of propylene (Examples 8–9) give the highest WVTR at a given olefin level. However, the copolymers of propylene still gives WVTR which are well within the aforementioned critical range. The lowest oxygen permeability values at a given olefin level are obtained using ethylene as a comonomer (Examples 1–7). Isobutylene copolymers (Example 10) shows the next best oxygen permeability results. The copolymers of propylene while showing oxygen permeability rates higher than the foregoing copolymers, are still well below the maximum of the oxygen permeability range that can be tolerated in the more critical packaging applications. Low oxygen permeability, water vapor transmission rates and good thermal processing are common to all the foregoing copolymers which are prepared in accordance with the practice of this invention and which have an olefin content in the critical range (i.e. 5 to 40 percent by weight) and a single, narrow melting endotherm as measured by differential thermal analysis. However, ethylene copolymers have the advantage of better water resistance and better thermal stability in comparison with the copolymers of propylene and isobutylene. Isobutylene is better than the propylene and in both these respects, although not as good as ethylene.

Copolymers of propylene and isobutylene have an advantage over ethylene copolymers in that they require very low polymerization pressure and they result in a greater decrease in the crystalline melting point of the vinyl alcohol copolymers. An additional advantage of isobutylene over propylene as a comonomer is that isobutylene does not reduce the molecular weight and does not retard polymerization as much as does propylene.

The thermal processing properties of the copolymers of this invention are far superior to those of polyvinyl alcohol homopolymer. In addition to this improved thermal processing the copolymers of this invention have desirably reduced water vapor transmission rates which are far lower than those obtained using polyvinyl alcohol homopolymer. Even more surprising is that the copolymers of this invention have unexpectedly good oxygen permeability properties which equals that of the straight polyvinyl alcohol.

The gas chromatograph tests on the bottles give barrier property results which are comparable to the results obtained on the film samples. However, the poorer thermal processing characteristics of the resins with the broad and/or double melting endotherms (Examples 11–15) were even more apparent in the thick walled bottles. The uneven melt characteristics of these resins cause burn spots and/or gel specks which marred the appearance of the bottle. On the other hand, the resins which were prepared in accordance with the teachings of this invention, (Examples 1–10) were readily thermo-formable into thick walled bottles which were free from burn spots and/or gel specks.

The following table is set forth to illustrate the poorer oxygen permeability obtained with polymers other than the olefin/vinyl alcohol copolymers of this invention. The samples were tested according to the procedures described above.

TABLE IV.—OXYGEN PERMEABILITY FOR VARIOUS POLYMERS

| Polymer: | Oxygen permeability [1] |
|---|---|
| Polystyrene (oriented) | 326.0 |
| Polystyrene (unoriented) | 416.0 |
| High density polyethylene | 150.0 |
| Low density polyethylene | 510.0 |
| Polyvinyl alcohol (fully hydrolyzed) | .08 |
| 4-methylpentene/3-methyl butene [2] | 2790.0 |
| Polyvinyl chloride | 10.0 |
| Polypropylene (biaxially oriented) | 140.0 |
| Polycarbonate | 135.0 |

[1] Oxygen permeability values given in cc./100 sq. in./24 hr./atmos./mil. at 73° F.
[2] Prepared using an 85/15 mol percent monomer feed ratio.

The results in Table IV illustrate the inferior oxygen permeability of some well known packaging materials and serve to further emphasize the totally unexpected superior properties that are achieved when using the olefin/vinyl alcohol copolymers of this invention.

The polymeric phenomena responsible for the improved barrier properties described in this invention is the critical balance of olefin/vinyl alcohol content, the narrow distribution of olefin in the polymer and the lack of significant amount of homopolymer in the polymeric product. The olefin must be present in an amount which is at least 5 weight percent of the total polymer weight in order to obtain a WVTR of less than 8.5 gms./100 sq. in./24 hr./mil at 73° F. and 100% R.H. The upper limit for the olefin content is 40% which limit is necessary in order to maintain oxygen permeability of less than 1.0 cc./100 sq. in./24 hr./cm. Hg/mil at 73° F. These levels of permeance are the maximum limits tolerable for use in areas requiring critical barrier properties, if product degradation, oxidation or loss of taste and/or aroma is to be avoided. In this regard, it should be noted that when the olefin is restricted to ethylene, an oxygen permeability of less than 0.5 cc./100 sq. in./24 hr./cm. Hg/mil at 73° F. will be achieved within the 5 to 40 weight percent ethylene range.

The lower limit of 5 weight percent olefin is also essential if the packaging materials is to be used in the critical packaging applications discussed above in the form of bottles, containers, sheets and other bulky objects. As the olefin content of the polymer falls below 5 weight percent or conversely as the vinyl alcohol content exceeds 95 weight percent and approaches 100 weight percent (polyvinyl alcohol), it becomes extremely difficult to shape the polymer into bulky objects (e.g., bottles, containers, sheets, etc.) in conventional plastic forming equipment. Thin films of polymers containing more than 95% polyvinyl alcohol are most conveniently prepared by a solution casting process and are not adaptable to forming bulky objects. Upon heating to about 220° C. (428° F.) polymers containing more than 95 weight percent polyvinyl alcohol retain sufficient crystallinity to essentially preclude flow. When heated to the still higher temperatures that are required to melt the crystalline polyvinyl alcohol chains (approximately 225 to 245° C.), the polymer rapidly degrades as shown by discoloration, massive gel specks, reduced solubility, etc. Thus, the physical properties associated with polymers containing greater than 95% polyvinyl alcohol seriously limit the thermoforming of bulky objects and only allow the solvent casting of thin films.

However, the presence of an olefin comonomer in the olefin/vinyl alcohol copolymers of this invention gives rise to a very fortuitous situation to give a product with a lower melting temperature range and good flow behavior at lower temperatures.

As a result, the polymers not only exhibit good barrier properties but they have the critical properties which allow them to be readily shaped into films and bulky objects which meet the critical packaging requirements for certain food and drug applications.

The packing films prepared from the foregoing polymers may be made by extrusion, pressing, calendering, casting and by other methods as are well known to those skilled in the art. Bottles and containers may be made by any of the conventional methods such as blow extrusion, injection molding, vacuum forming, casting, etc. The packaging materials of this invention are especially useful in flush and vacuum packaging operations, as they provide good barriers to flush gases such as nitrogen.

In addition to the foregoing, the polymers of this invention may be applied as a barrier coating onto paper, corrugated board, laminated paper products, polymer films, and other related materials that are used in the packaging industry. These barrier coatings may be applied to these various substrates by any of the known methods, e.g., melt extrusion coating, solvent coating, etc.

This invention also contemplates the use of conventional additives such as dyes, fillers, pigments, plasticizers, stabilizers, etc. in the packaging materials of this invention.

It is obvious that many deviations may be made in the products and processes set forth above without departing from the scope of this invention.

What is claimed is:

1. Packaging materials for foods, medicines and other related substances wherein the packaging materials exhibit oxygen permeability of less than 1.0 cc./100 sq. in./24 hr./cm. Hg/mil at 73° F. and water vapor transmission of less than 8.5 gms./100 sq. in./24 hr./mil at 73° F. and 100% R.H. and comprise a lower alpha/olefin/vinyl alcohol copolymer with a residual ester content below 3% by weight wherein the olefin contains from 2 to 4 carbon atoms and wherein the olefin content in the copolymer is in the range of from 5 to 40% by weight and wherein the differential thermal analysis curve for the copolymer is a single narrow endotherm having a melting range of less than 30° C.

2. The packaging materials of claim 1 wherein the olefin is ethylene.

3. The packaging materials of claim 1, wherein the olefin is propylene.

4. The packaging materials of claim 1 wherein the olefin is isobutylene.

5. Packaging materials for foods, medicines and other related substances wherein the packaging materials exhibit oxygen permeability of less than 1.0 cc./100 sq. in./24 hr./cm. Hg/mil at 73° F. and water vapor transmission of less than 8.5 gms./100 sq. in./24 hr./mil at 73° F. and 100% R.H. and comprise an ethylene/vinyl alcohol copolymer with a residual ester content below 2% by weight and wherein the ethylene content in the copolymer is in the range of from 8.9 to 36.7% by weight and wherein the differential thermal analysis curve for the copolymer is a single narrow endotherm having a melting range of less than 30° C.

6. Packaging material as in claim 5 wherein the ethylene content of the copolymer is in the range of from 12 to 29.8% by weight.

7. Packaging material as in claim 6 wherein the residual ester content is less than 1% by weight.

8. Packaging material as in claim 7 wherein the residual ester is vinyl acetate.

References Cited

UNITED STATES PATENTS

| | | | |
|---|---|---|---|
| 2,386,347 | 10/1945 | Roland | 260—86 |
| 2,397,866 | 4/1946 | McQueen | 95—7 |
| 2,703,794 | 3/1955 | Roedel | 260—87.3 |

FOREIGN PATENTS

| | | |
|---|---|---|
| 655,298 | 1/1963 | Canada. |
| 1,126,614 | 3/1962 | Germany. |

OTHER REFERENCES

Alfrey, Bohrer, & Mark: Copolymerization, Interscience Publishers, New York, 1952, pp. 147–156.

Raff and Allison: Polyethylene, Interscience, New York (1956), pp. 266–72 and 295–99.

Renfrew and Morgan: Polyethylene, Iliffe & Sons, London (1957), pp. 199–201.

JOSEPH L. SCHUTER, Primary Examiner

J. KIGHT III, Assistant Examiner

U.S. Cl. X.R.

99—171

PO-1050
(5/69)

UNITED STATES PATENT OFFICE
CERTIFICATE OF CORRECTION

Patent No. 3,585,177        Dated June 15, 1971

Inventor(s) Donald M. Gardner, Joseph G. Martins, Leo J. Monaghan

It is certified that error appears in the above-identified patent and that said Letters Patent are hereby corrected as shown below:

Column 2, line 57, after "or" delete "ole" and insert --- olefin ---.

Column 4, Table I, Example 2, under "Percent Conversion" "23.6" should read --- 23.0 ---.

At Column 5, after the final line (line 75) insert --- 70% at temperatures between -50°C. and 100°C. Re- ---.

At Column 6, delete line 17.

Column 11, line 22, "packing" should read --- packaging ---.

Signed and sealed this 28th day of December 1971.

(SEAL)
Attest:

EDWARD M. FLETCHER, JR.          ROBERT GOTTSCHALK
Attesting Officer                 Acting Commissioner of Patents